(12) United States Patent
Diez et al.

(10) Patent No.: US 11,063,535 B2
(45) Date of Patent: Jul. 13, 2021

(54) STEERING MOTOR BRAKE

(71) Applicant: Ford Global Technologies, LLC, Dearborn, MI (US)

(72) Inventors: Timothy Patrick Diez, Dearborn, MI (US); Brian Rutkowski, Ypsilanti, MI (US); David Rutkowski, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 73 days.

(21) Appl. No.: 16/571,016

(22) Filed: Sep. 13, 2019

(65) Prior Publication Data

US 2021/0083604 A1 Mar. 18, 2021

(51) Int. Cl.
*H02P 3/22* (2006.01)
*B62D 5/04* (2006.01)

(52) U.S. Cl.
CPC ............... *H02P 3/22* (2013.01); *B62D 5/046* (2013.01)

(58) Field of Classification Search
CPC . B62D 5/046; H02P 27/08; H02P 7/29; H02P 3/22
See application file for complete search history.

(56) References Cited

U.S. PATENT DOCUMENTS

| | | | |
|---|---|---|---|
| 7,019,479 B2* | 3/2006 | Tobias | B62D 5/0484 318/400.21 |
| 8,508,180 B2* | 8/2013 | Tagome | H02P 27/06 318/724 |
| 10,141,872 B2* | 11/2018 | Cash | H02H 7/0844 |
| 10,259,491 B2* | 4/2019 | Shinkawa | B62D 5/0484 |
| 2013/0026968 A1* | 1/2013 | Tagome | H02P 25/22 318/724 |
| 2014/0077736 A1* | 3/2014 | Donner | B62D 5/0487 318/400.21 |
| 2017/0166248 A1* | 6/2017 | Asao | B62D 5/0493 |
| 2017/0366118 A1* | 12/2017 | Gyoten | H02M 7/537 |
| 2018/0175777 A1* | 6/2018 | Ando | H02P 27/08 |

* cited by examiner

*Primary Examiner* — Thai T Dinh
(74) *Attorney, Agent, or Firm* — Frank Lollo; Eversheds Sutherland (US) LLP (57) ABSTRACT

This disclosure describes a method for shorting one or more windings in a steering motor. The method determines that a signal has not been received at a circuit from a processor. The method discharges a first capacitor in the circuit in response to the circuit not receiving the signal from the processor. The method turns on a first plurality of transistors via a resistor in response to discharging the first capacitor. The method turns on a second plurality of transistors in response to turning on the first plurality of transistors. The method sends a short circuit signal from the second plurality of transistors to a steering motor.

20 Claims, 5 Drawing Sheets

STEERING MOTOR BRAKE

TECHNICAL FIELD

The present disclosure relates to a three phase circuit for use in a vehicle environment. In some embodiments, the present disclosure utilizes a field effect transistor (FET) circuit to short the windings in a steering motor thereby enabling the rear wheels of a vehicle to straighten after a vehicle exits a turn in order to reduce unintended effects on vehicle control if the steering motor malfunctions.

BACKGROUND

Electric motors that are used in electric power steering systems to steer a vehicle must have the ability to be disabled if a microprocessor in the electric motor malfunctions. Particularly in rear steer systems, it is desirable to brake an electric steering motor and let the return springs, in the electric steering motor, slowly bring the wheels into a straight orientation after the vehicle completes a turn. Some systems use a mechanical relay to short windings in the electric steering motor, using normally closed contacts. When the contacts are open, the electric steering motor can turn the wheels on the vehicle freely. However when the relay is de-energized and the contacts are closed, the electric steering motor is unable to steer the wheels on the vehicle, so the windings that control the maneuverability of the wheels is disabled as a result. Mechanical relays override any motor control transistors in the electric steering motor, and provides a braking function that cause the wheels to move into a straightened position under the influence of centering springs in the electric steering motor. One notable issue with using a mechanical relay however is the movement of the contacts as the vehicle is moving thereby causing them to bounce. Another issue is the ability for the contacts to cause arcing, the lifespan of the contacts, and sensitivity to vibration and shock.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Electric power steering (EPS) is an important high-power load. The electrification of steering systems has led to a dramatic improvement in the efficiency of automotive vehicles. Depending on the vehicle class, electric power steering can consume over 90% less energy than hydraulic servo steering system. Electrification reduces the average power demand because there no permanently-running hydraulic pumps are required. EPS systems consume energy only during operation. This can lead to a fuel reduction of up to 0.4 liters per 100 kilometers on an expressways and up to 0.8 liters per 100 kilometers in urban traffic.

Further benefits of EPS systems are increased safety functions, more comfort and less maintenance (no hydraulic oil system) compared to the conventional hydraulic servo steering system. An EPS system allows additional functions to be implemented. For example, EPS systems may assist the driver in critical driving situations, such as corrective steering measures during parking and on the highway. EPS also makes self-parking possible. In a conventional hydraulic servo steering system the hydraulic oil requires routine maintenance. This is not necessary in the case of EPS system, which leads to reduced maintenance costs.

The systems and methods described herein relate to one or circuits that use a normally off field effect transistor (FET) circuit, in an EPS system, in place of a mechanical relay that is used in conventional rear EPS systems. The one or more circuits maintain a constant transistor bias under all conditions including loss of power. The one or more circuits use energy storage devices in the form of a super capacitor that stores electrical energy, and battery storage technologies. Non-volatile memory devices are also incorporated with the one or more circuits to indicate the system is in a safe mode and does not require an override of the motor drive control inverter.

In one embodiment the EPS may include a circuit comprised of a plurality of circuit components. The components include transistors, capacitors, resistors, one or more power supplies that supply power to different parts of the circuit, a processor, non-volatile memory, a three-phase inverter, and three-phase steering motor. The three-phase steering motor may include three windings that are arranged in a delta connection, but in some embodiments, they may be arranged in a Y connection. The circuit may also include a charge pump as well. The circuit may connect each of three of the transistors to one of the windings in the three-phase steering motor. When the transistors are energized they may short all of the windings in response to the processor not receiving valid signals from the three-phase inverter.

In another embodiment the EPS may include a circuit comprised of plurality of circuit components. The components include transistors, capacitors, resistors, one or more power supplies that supply power to different parts of the circuit, a processor, non-volatile memory, a three-phase inverter, and three-phase steering motor. The three-phase steering motor may include three windings that are arranged in a delta connection, but in some embodiments, they may be arranged in a Y connection. The circuit may also include a charge pump as well. The circuit may connect each of two of the transistors to one of the windings of the three-phase steering motor. When the transistors are energized they may short just two of the windings in response to the processor not receiving signals from the three-phase inverter.

Illustrative Embodiments

Figure 1:
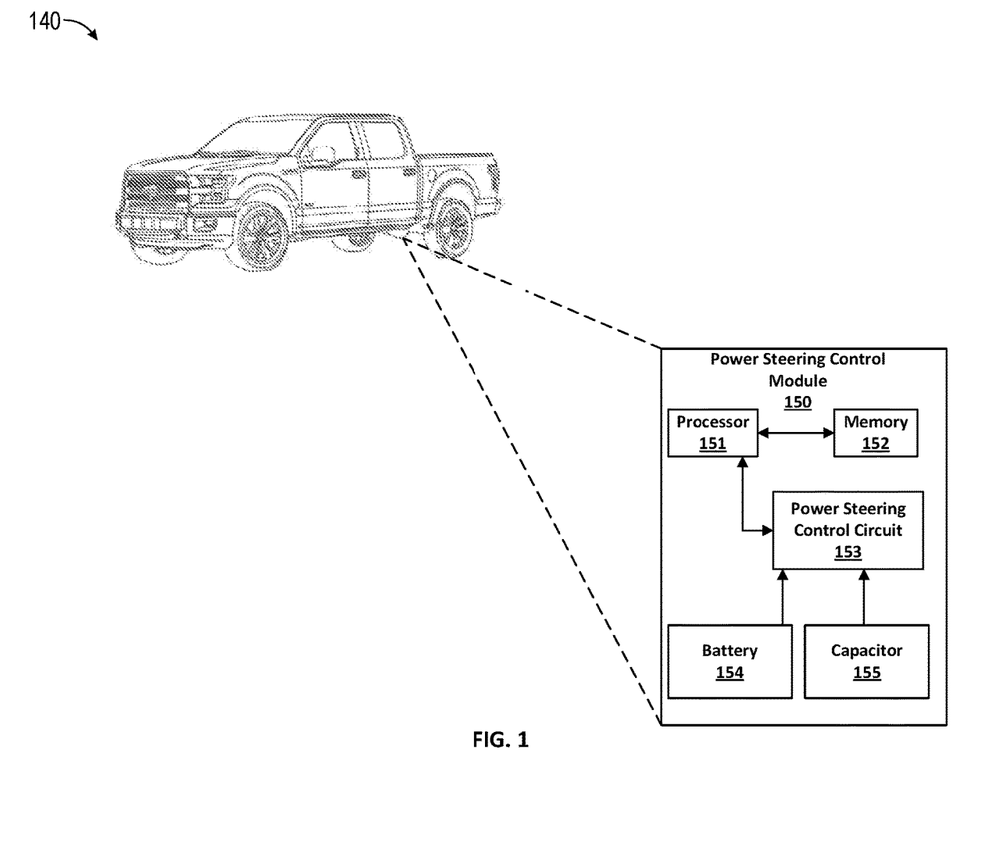
FIG. 1 depicts an exemplary vehicle and steering components of an electronic power steering system in accordance with the present disclosure.

FIG. 1 depicts an exemplary vehicle 140 and power steering control module 150, that may be located near or on the rear axis of exemplary vehicle 140. Power steering control module 150 may be responsible for braking power steering electronic motor 170 when processor 151 stops receiving signals from steering control circuit 153. Processor 151 may perform the same functions as those described with general reference to the processor throughout the application. That is the processor may perform the blocks in FIGS. 3 and 4. Memory 152 stores instructions that are executed by processor 151 to cause the steering motor brake circuits to perform the actions disclosed herein. When referring to operations executed by power steering control module 150 it will be understood that this includes the execution of instructions by processor 151.

Figure 2:
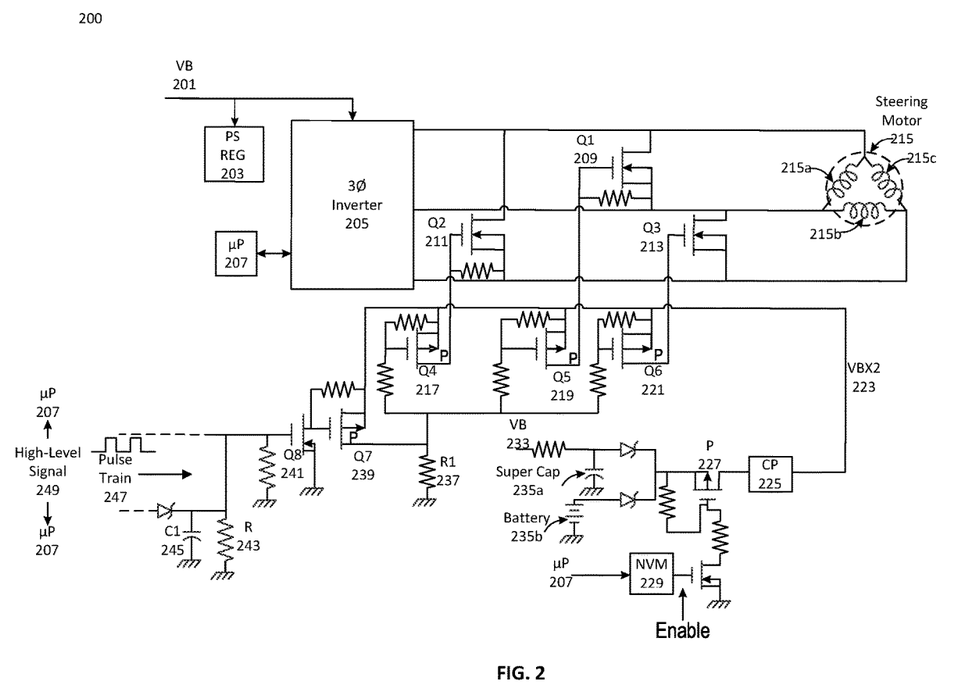
FIG. 2 depicts an exemplary steering motor brake circuit in accordance with the present disclosure.
Figure 3:
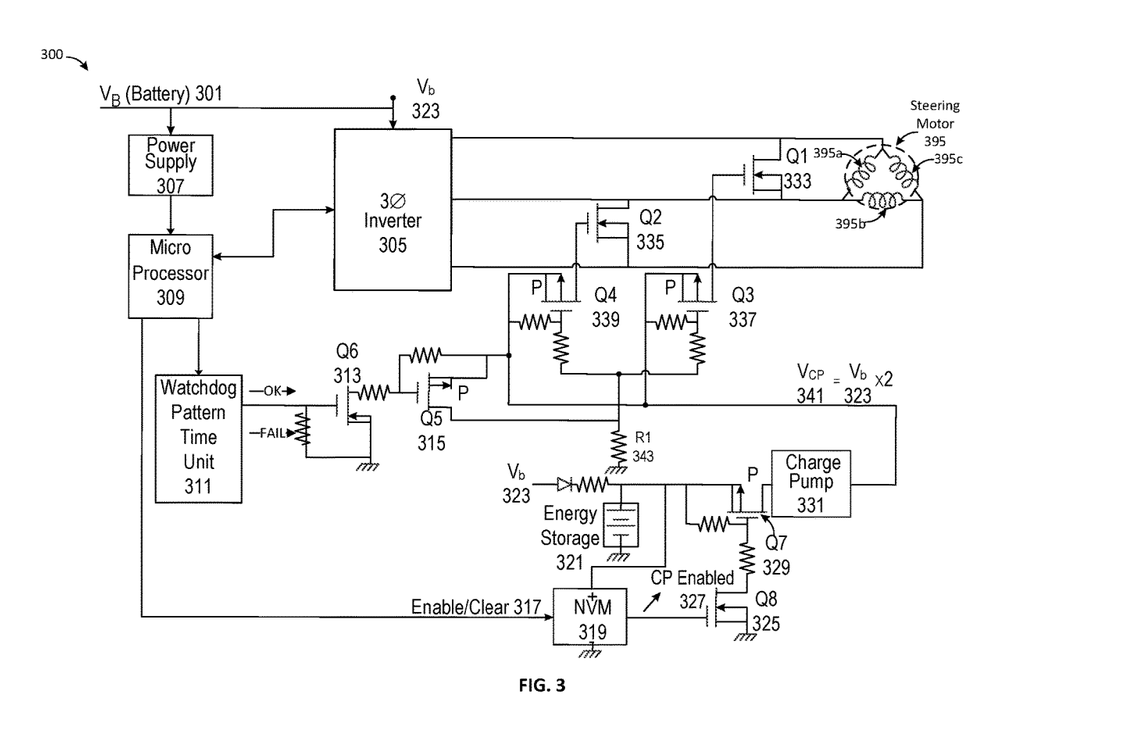
FIG. 3 depicts an exemplary steering motor brake circuit in accordance with the present disclosure.

Steering control circuit 153 may be implemented in one of two embodiments. In a first embodiment, steering control circuit 153 may be implemented based at least in part on steering motor brake circuit 200. In a second embodiment, steering control circuit 153 may be implemented based at least in part on steering motor brake circuit 300. Battery 154 may be a power source, that may power steering control circuit 153, and capacitor 155 may be a power source, that also powers steering control circuit 153. In some embodiments, battery 154 may power steering control circuit 153 in isolation. In some embodiments, capacitor 155 may power steering control circuit 153 in isolation. Yet still in other embodiments, battery 154 and capacitor 155 may both power steering control circuit 153. Battery 154 may be implemented as battery 235b in a first embodiment, and may be implemented as energy storage 321. Capacitor 155 may be implemented as super cap 235a in a second embodiment, and may be implemented as energy storage 321.

FIG. 2 depicts an exemplary steering motor brake circuit 200 in accordance with the present disclosure. Steering motor brake circuit 200 may comprise one or more resistors, capacitors, transistors, power sources, charge pumps, diodes, non-volatile memory, super capacitors, and a steering motor. The resistors, capacitors, transistors, power sources, charge pumps, diodes, non-volatile memory, super capacitors, may be arranged in a specific way to stop or brake steering motor 215 when a microprocessor (e.g., μP 207) fails to provide valid signals to steering motor 215 through three phase inverter (e.g., 3ø inverter 205). μP 207 is functionally identical to processor 151. VB 201 is a battery voltage that supplies power to 3ø inverter 205. The power provided to 3ø inverter 205 from VB 201 enables 3ø inverter 205 to control windings 215a, 215b, and 215c, of steering motor 215. Steering motor 215 may be a motor with three phases. In some embodiments, steering motor 215 may not be a three-phase motor. PS REG 203 is a power supply regulator that regulates the supply of power from VB 201 to 3ø inverter 205. VB 201 may be a direct current (DC) power supply, and PS REG 203 may control or regulate the power applied to 3ø inverter 205. For example, PS REG 203 may increase or decrease the power supplied to 3ø inverter 205 which will in turn control the amplitude, frequency, and phase of the current and/or voltage applied to windings 215a, 215b, and 215c. These windings may also be referred to as phases. The power supplied to 3ø inverter 205 may be adjusted in accordance with an operator's driving. For instance, PS REG 203 may limit or increase the power supply to 3ø inverter 205 based on the power requirements for steering motor 215 to respond to a driver steering the vehicle. μP 207 may provide control signals to 3ø inverter 205 which may control the operation of 3ø inverter 205. For example, μP 207 may send one or more signals to the 3ø inverter 205 that may cause 3ø inverter 205 to change the amount of current or voltage applied to anyone of the three phases of steering motor 215 responsive to a driver turning a steering column of a vehicle. 3ø inverter 205 may also send signals to μP 207 to indicate that it is still responsive to instructions or commands sent to it from μP 207. 3ø inverter 205 may send periodic signals to μP 207 to indicate that it is still functioning properly.

If the μP 207 is receiving valid signals from the inverter and μP 207 is operating within established norms it sends periodic signals either as a pulse train 247 or a status signal 249 to transistor Q8; it also writes a signal to non-volatile memory (NVM) 229. The signals, 247 or 249 keep transistor Q8 on and the signal in NVM 229 enables the charge pump 225. In some embodiments, VBX2 223 may be 24 volts. This voltage may be higher than the voltages applied to the motor windings in order to energize transistors Q1 209, Q2 211, and Q3 213. CP 225 may be powered by a super capacitor (Super Cap 235a) which is charged to voltage Vb. Super Cap 235a may be the prime power source to preserve battery energy. If the voltage produced by Super Cap 235a is lower than the power available stored in battery 235b, then battery 235a will power CP 225. Battery 235b may be charged by VB 233. The 24 volts ensures that transistors Q1 209, Q2 211, and Q3 213 will be turned on. Super Cap 235a may be charged with power supply VB 233. VB 233 may be a DC power supply. Transistors Q1 209, Q2 211, and Q3 213 may short the windings 215a, 215b, and/or 215c. Transistors Q1 209, Q2 211, and Q3 213 are energized by transistors Q4 217, Q5 219, and Q6 221. Resistor R1 237 turns on transistors Q4 217, Q5 219, and Q6 221 by biasing the gate-source of these transistors with a negative voltage. As a result, transistors Q4 217, Q5 219, and Q6 221 turn on transistors Q1 209, Q2 211, and Q3 213. When transistors Q1 209, Q2 211, and Q3 213 are turned on windings 215a, 215b, and 215c are shorted and Steering Motor 215 is disabled allowing the wheels (not shown) of the vehicle to straighten after the operator of the vehicle has made a turn. In some embodiments, windings 215a, 215b, and 215c may not be shorted when transistors Q7 239 and Q8 241 are energized or turned on. Transistors Q7 239 and Q8 241 are normally energized (on) in response to μP 207 applying pulse train 247 or status signal 249. If pulse train 247 or status signal 249 is interrupted, transistor Q8, and thus transistor Q9 will de-energize (turn off) and the motor brake transistors will be energized.

If the steering system is active, μP 207 disables shorting FETs (i.e., transistors Q1 209, Q2 211, and Q3 213) in response to pulse train 247 at Q8 241. Q8 241 may be turned on based at least in part on high-level signal 249 or by pulse train 247. If μP 207 stops sending high-level signal 249, while steering motor 215 is active, the shorting FETs may turn on and short 3ø inverter 205, which will in turn brake steering motor 215. Pulse train 247 keeps capacitor C1 245 charged and the high-level signal keeps transistor Q8 241 on. If pulse train 247 ceases, capacitor C1 245 discharges, and transistor Q8 241 turns off and the shorting FETs are turned on. μP 207 will write a high-level signal (a digital 1) to NVM 229. This high-level signal causes energy storage devices Super Cap 235a and Battery 235b to supply power CP 225. NVM 229 provides power to the shorting FETs if the signals 247 or 249 cease.

During a normal vehicle shutdown μP 207 will first write a low signal to NVM 229 to disable circuit steering motor brake circuit 200 and energy stored in Super Cap 235a from draining. When the operator turns on the ignition, μP 207 may stop sending high-level signal 249, in order to perform a diagnostic check on the shorting FETs so as to ensure the transistors in 3ø inverter 205s are driving into steering motor 215 when it is short circuited. μP 207 may also monitor the energy in super cap 235a and battery 235b, and voltage produced by CP 225.

FIG. 3 depicts an exemplary steering motor brake circuit in accordance with the present disclosure. During normal operations, microprocessor 309 controls steering motor 395 via 3ø inverter 305. Microprocessor 309 is functionally identical to processor 151. During a fault condition (i.e. microprocessor 309 failure), it may be necessary to independently disable the motor drive associated with steering motor 395 with a failsafe circuit to force the steering motor 395 to brake and gradually return to a neutral position in line with return springs in a gear train.

Two transistors (Q1 333 and Q2 335) may be placed across two of steering motor 395 phases (phases 395a and 395b respectively) to short the motor leads and brake steering motor 395. Q1 333 and Q2 335 are sized to overwhelm the transistors that are in 3ø inverter 305. To guarantee Q1 333 and Q2 335 are turned on, the voltage driving the gate on each of Q1 333 and Q2 335 must be greater than the voltage on the motor phases which may be VB (battery voltage) to which they connect (phases 395a and 395b respectively). In order to achieve this a voltage multiplier, referred to as a charge pump (Charge Pump 331), may be used to generate a voltage twice that of the voltage produced by the battery (not shown). The voltage produced by the battery is Vb 323, and the voltage produced by charge pump 331 is VCP 341=Vb 323×2. An energy source such as a super capacitor, similar to the Super Cap 235a, may be used to power charge pump 331. In some embodiments, a rechargeable battery may be used in place of the super capacitor. The rechargeable battery may be similar to battery 235b. To prevent quiescent discharge of this energy source, the energy source may be disconnected by Q7 329 when the vehicle is not receiving power from the battery that starts the vehicle. A non-volatile memory unit (NVM 319) may be used to store the enable/clear state (Enable/Clear 317) of microprocessor 309 during a possible failure of microprocessor 309 so that charge pump 331 continues to receive power. Microprocessor 309 may send periodic diagnostic signals to watchdog pattern timer unit 311. The diagnostic signals indicate that microprocessor 309 is functioning properly. These diagnostic signals may bias R1 343, which may in turn off, or disable Q1 333 and Q2 335. In the event that microprocessor 309 is malfunctioning, and stops sending these diagnostic signals to watchdog pattern timer unit 311, Q3 337 and Q4 339 will be biased by R1 343, which in turn results in Q1 333 and Q2 335 being enabled or turned on.

In some embodiments, it is possible to use a dedicated small microprocessor that includes the watchdog diagnostic function between microprocessor 309 and watchdog pattern timer unit 311, as well as the enable/clear function. In this embodiment, the small microprocessor may communicate with a main microprocessor to determine what state (i.e., on or off/enabled or disabled) of Q1 333 and Q2 335. Q1 333 and Q2 335 may be referred to as the braking FETs. If transistor Q5 315 is off, resistor R1 343 forms a voltage divider with the resistors connected to transistors Q3 337 and Q4 334 and Vcp 341 to develop a negative gate to source voltage (Vgs) for transistors Q3 337 and Q4 334. A negative Vgs will energize (turn on) a P channel FET, such as transistors Q3 337 and Q4 334. If transistor Q5 315 is turned on, voltage Vcp 341 is applied to resistor R1 343 which will turn transistor Q3 337 and Q4 334 off.

Figure 4:
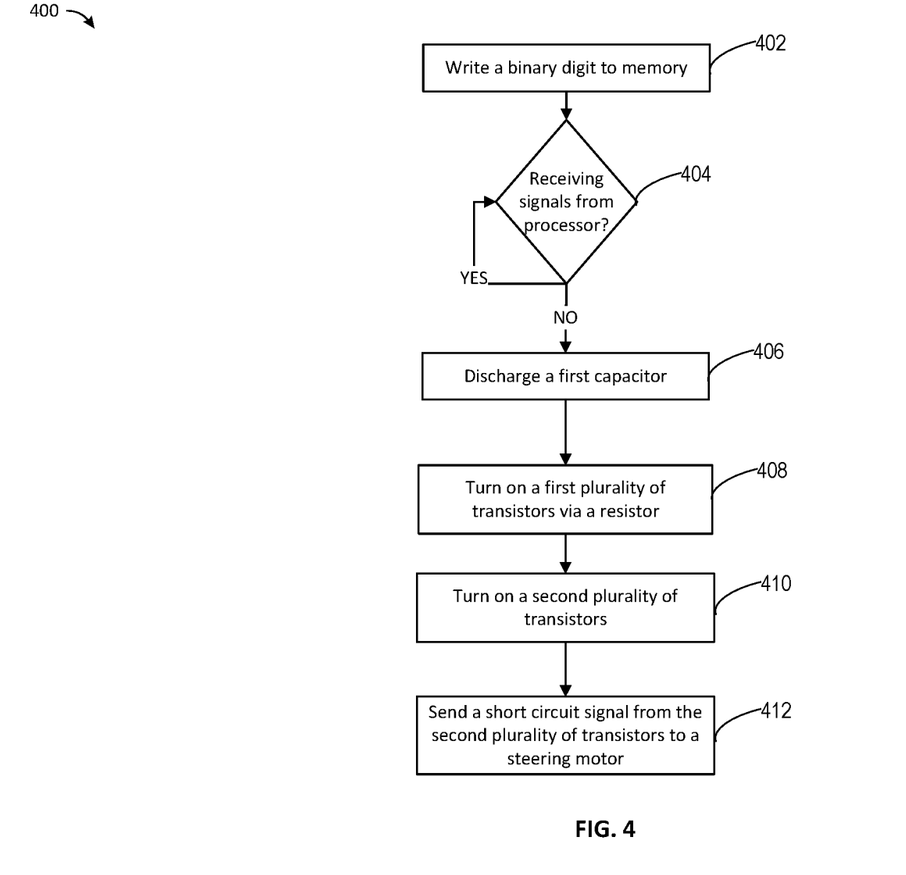
FIG. 4 is a flowchart of an example method of braking a steering motor in accordance with the present disclosure.

FIG. 4 is a flowchart of an example method of braking a steering motor in accordance with the present disclosure. The method may begin at block 402, where a power steering control circuit (e.g., power steering control circuit 153) may write a binary digit (e.g., a "1" or "0") to memory (e.g., NVM 229). At block 404, the method may determine whether it is still receiving signals from a processor (e.g., μP 207). The signal may be a pulse train such as pulse train 247, and the circuit element that receives the signals is a capacitor such as capacitor C1 245. Pulse train 247 may keep capacitor C1 245 charged to a certain electric potential or voltage. If capacitor C1 245 remains charged the method may return to block 404 (YES). While capacitor C1 245 remains charged, transistor Q8 241 will turn on and/or remain turned on. In some embodiments, a constant high level signal instead of the on-off keying pulse train 247 signal.

If capacitor C1 245 does not receive pulse train 247 from processor μP 207 then the method may progress to block 406 (NO). At block 406, a first capacitor (e.g., capacitor C1 245) may discharge, and the method may progress to block 408. At block 408, the method may turn on a first plurality of transistors via a resistor. The first plurality of transistors may be transistors Q4 217, Q5 219, and Q6 221. As capacitor C1 245 discharges, transistor Q8 241 will turn off, thereby allowing current to flow to transistors Q4 217, Q5 219, and Q6 221 thereby turning transistors Q4 217, Q5 219, and Q6 221 on.

At block 410 the method may turn on a second plurality of transistor. The second plurality of transistors may be transistors Q1 209, Q2 211, and Q3 213. After transistors Q4 217, Q5 219, and Q6 221 turn on, transistors Q1 209, Q2 211, and Q3 213 (shorting FETs) will also turn on. At block 412, the method may send a short circuit signal to a steering motor. After transistors Q1 209, Q2 211, and Q3 213 turn on, the shorting FETs may short windings 215a, 215b, and 215c of steering motor 215.

Figure 5:
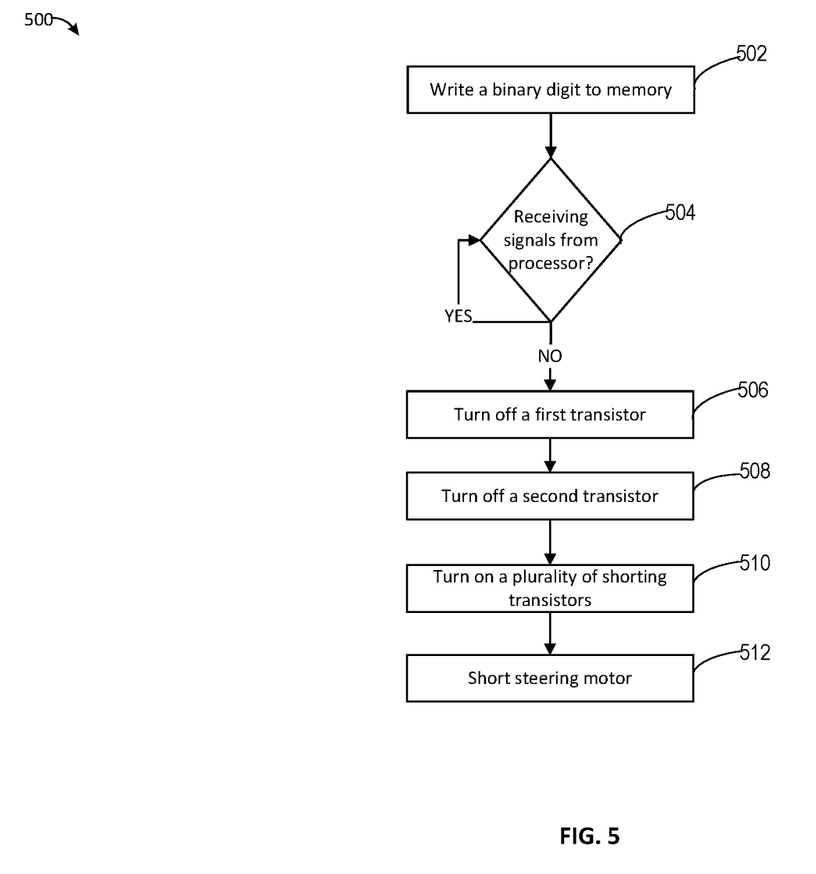
FIG. 5 is a flowchart of an example method of braking a steering motor in accordance with the present disclosure.

FIG. 5 is a flowchart of an example method of braking a steering motor in accordance with the present disclosure. The method may begin at block 502, where a power steering control circuit (e.g., power steering control circuit 153) may write a binary digit (e.g., "1" or "0") to memory (e.g., NVM 319). At block 504 the method may determine whether it is still receiving signals from a processor (e.g., microprocessor 309). If the power steering control circuit continues to receive signals from microprocessor 309, the method may return to block 504. More specifically, if watchdog circuit 311 continues to receive signals from microprocessor 309 then the method may return to block 504. If watchdog circuit 311 continues to receive signals from microprocessor 309, watchdog circuit 311 may output a high voltage (e.g., 5 volts) signal to keep transistor Q6 313 on, which may in turn keep transistor Q5 315 on. While transistor Q5 315 is on, it provides a positive voltage to R1 343 to keep transistors Q1 333, Q2 335, Q3 337, and Q4 339 off.

If the power steering control circuit does not continue to receive signals from microprocessor 309, the method may progress to block 506, where transistor Q6 313 may be turned off, which in turn may turn off transistor Q5 315 at block 508. More specifically, if the proper signals are not received by watchdog circuit 311, transistor Q6 313 may turn off and transistor Q6 313 may turn off transistor Q5 315. If an OK signal is not received by watchdog circuit 311, transistors Q6 313 and Q5 315 will turn off and transistors Q1 333, Q2 335, Q3 337, and Q4 339 will turn on at block 510. After transistors Q1 333, Q2 335, Q3 337, and Q4 339 turn on, they may short steering motor 395 at block 512.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   determining that a signal has not been received, by a circuit, from a processor;
   discharging a first capacitor in the circuit in response to the circuit not receiving the signal from the processor;
   turning on a first plurality of transistors via a resistor in response to discharging the first capacitor;
   turning on a second plurality of transistors in response to turning on the first plurality of transistors; and
   sending a short circuit signal from the second plurality of transistors to a steering motor.

2. The method of claim 1, wherein the short circuit signal is a pulse train signal.

3. The method of claim 2, further comprising turning off a first transistor responsive to the first capacitor discharging.

4. The method of claim 3, wherein the first transistor causes the first plurality of transistors to turn on.

5. The method of claim 3, wherein the first transistor is turned on responsive to the pulse train signal.

6. The method of claim 3, wherein the first transistor is turned on responsive to a constant high-level signal.

7. The method of claim 1, further comprising applying a voltage to the second plurality of transistors from a super capacitor.

8. The method of claim 1, further comprising applying a voltage to the second plurality of transistors from a battery.

9. The method of claim 1, wherein the second plurality of transistors comprises a first, a second, and a third transistor.

10. The method of claim 9, wherein the steering motor comprises:
    a first phase, a second phase, and a third phase, and
    the first transistor is connected to the first phase, the second transistor is connected to the second phase, and the third transistor is connected to the third phase.

11. The method of claim 10, wherein the first transistor causes to send the short circuit signal to the first phase, the second transistor short to send the short circuit signal to the second phase, and the third transistor to send the short circuit signal to the third phase, in response to the first transistor, the second transistor, and the third transistor being turned on.

12. A system comprising:
    a circuit;
    a processor electrically connected to the circuit;
    a first capacitor electrically connected to the circuit that discharges in response to the circuit not receiving a signal from the processor;
    a first plurality of transistors electrically connected to the first capacitor that are energized in response to the discharge of the first capacitor;
    a second plurality of transistor electrically connected to the first plurality of transistors that are energized in response to the first plurality of transistors being energized; and
    a steering motor electrically connected to the second plurality of transistors that receives a short circuit signal in response to the second plurality of transistors being energized.

13. The system of claim 12, wherein the short circuit signal is a pulse train signal.

14. The system of claim 13, further comprising turning off a first transistor in response to the discharge of the first capacitor.

15. The system of claim 14, wherein the first transistor causes the first plurality of transistor to be energized.

16. The system of claim 14, wherein the first transistor is energized in response to the pulse train signal.

17. The system of claim 14, wherein the first transistor is turned on in response to a constant high-level signal.

18. The system of claim 12, further comprising a super capacitor that applies a voltage to the second plurality of transistors.

19. The system of claim 12, further comprising a battery that applies a voltage to the second plurality of transistors.

20. The system of claim 19, wherein:
    the second plurality of transistors comprises a first, a second, and a third transistor; and
    the steering motor comprises:
    a first phase, a second phase, and a third phase, and
    the first transistor is connected to the first phase, the second transistor is connected to the second phase, and the third transistor is connected to the third phase.

* * * * *